Figure 1:
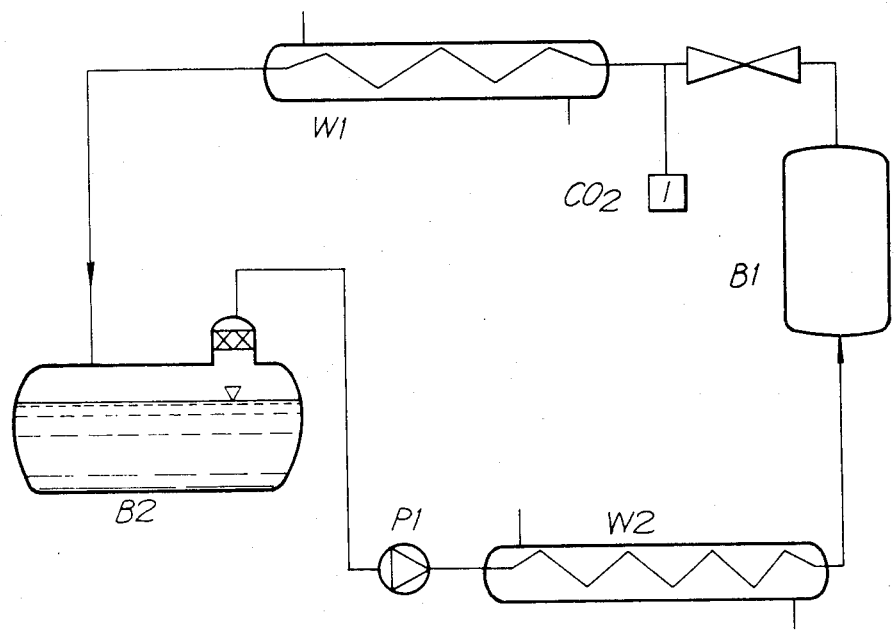

United States Patent [19]

Biernoth et al.

[11] Patent Number: 4,504,503

[45] Date of Patent: Mar. 12, 1985

[54] FRACTIONATION OF BUTTERFAT USING A LIQUEFIED GAS OR A GAS IN THE SUPERCRITICAL STATE

[75] Inventors: Gerhard Biernoth, Quickborn; Werner Merk, Buchholz, both of Fed. Rep. of Germany

[73] Assignee: Lever Brothers Company, New York, N.Y.

[21] Appl. No.: 413,937

[22] Filed: Sep. 1, 1982

[30] Foreign Application Priority Data

Sep. 9, 1981 [GB] United Kingdom ............... 8127261

[51] Int. Cl.$^3$ ............................................. A23D 5/02
[52] U.S. Cl. .................................... 426/312; 426/318; 426/319; 426/607; 426/417; 426/425; 260/428.5
[58] Field of Search ............... 426/312, 317, 318, 319, 426/417, 425, 603, 607; 260/428, 428.5

[56] References Cited

U.S. PATENT DOCUMENTS

| | | | |
|---|---|---|---|
| 1,805,751 | 5/1931 | Auerbach | 260/428 |
| 2,247,496 | 7/1941 | Hixson et al. | 260/428.5 |
| 2,467,906 | 4/1949 | Passino et al. | 260/428.5 |
| 2,613,215 | 10/1952 | Mattil | 426/313 X |
| 3,519,435 | 7/1970 | MacCollom | 426/417 X |
| 3,939,281 | 2/1976 | Schwengers | 426/429 X |
| 4,005,228 | 1/1977 | Norris | 426/429 X |
| 4,109,409 | 8/1978 | Vitzthum et al. | 426/319 X |
| 4,280,961 | 7/1981 | Schneider et al. | 260/428.5 X |
| 4,400,398 | 8/1983 | Coenen et al. | 426/478 X |

*Primary Examiner*—Robert Yoncoskie
*Attorney, Agent, or Firm*—James J. Farrell

[57] ABSTRACT

A process for producing a mixture of triglycerides displaying butter-like properties by fractionating fats with a liquefied gas or a gas under supercritical conditions. Said mixture of triglycerides predominantly consists of triglycerides with a carbon number ranging from 24 to 42 and can be used as one of the fat components of a margarine fat blend in order to improve its butter-like properties.

6 Claims, 5 Drawing Figures

FRACTIONATION OF BUTTERFAT USING A LIQUEFIED GAS OR A GAS IN THE SUPERCRITICAL STATE

The present invention relates to a process for producing a mixture of triglycerides having butter-like properties by fractionating fats using a liquefied gas or a gas in the supercritical state.

By butter-like properties is meant a plasticity and an elasticity which are reminiscent of those of natural butter. Publications relating to these properties and their measurements are, for example, J. Dairy Res, 8, 245 (1937), Davies J.C., and the British Food Manuf. Ind. Res. Inst., The Rheology of Margarine and Compound Cooking Fats, Part I (Res. Rep. 37) and Part II (Res. Rep. 69), 1956, Prentice J. H.

Triglycerides having butter-like properties can be used as one of the components of a fat blend for producing spreads, particularly margarines, with butter-like properties.

Such triglycerides have a carbon number (C) ranging from 24–42. By carbon number is meant the sum of the carbon atoms of the fatty acid residues in the triglyceride molecules. These triglycerides preferably contain one fatty acid residue containing not more than 10 carbon atoms and preferably 2 to 8 carbon atoms and 2 fatty acid residues containing at least 16 carbon atoms and preferably 16 or 18 carbon atoms.

Applicants have found that fractionating fats using a liquefied gas or a gas in the supercritical state is a very useful method for fractionating triglyceride fats according to their molecular weight and particularly their carbon number, rather than according to the degree of saturation of the fatty acid residues in the triglycerides.

The process according to the invention for producing a mixture of triglycerides having butter-like properties comprises extracting a fat containing triglycerides having a carbon number ranging from 24 to 42 with a liquefied gas or a gas in the supercritical state and fractionating said fat under conditions conducive to forming a fraction (i) enriched in said triglycerides having a carbon number ranging from 24 to 42 and displaying butter-like properties, and a fraction (ii) enriched in triglycerides having a carbon number higher than 42.

Useful gases are $N_2O$, $SF_6$, $CF_3Cl$, $CF_2Cl$, $CH_2CF_2$, $C_3F_8$, $CHF_3$, ethane, propane, butane, ethylene, acetone, carbon dioxide, or mixtures thereof, which are unobjectionable gases from the point of view of health. Carbon dioxide is the gas particularly preferred in the process according to the invention, and butterfat or hardened butterfat is the preferred fat.

The maximum temperature at which a gas can be liquefied is called the critical temperature and the pressure required to cause liquefaction at this temperature is the critical pressure. The critical temperature of e.g. carbon dioxide is about 31.1° C. and the critical pressure is 73.8 bar.

If gases other than carbon dioxide are used, the ranges in respect of pressures and temperatures outlined hereinafter in the specification can be obtained from data described in handbooks of Physical Chemistry.

Extraction of the starting material is preferably carried out under substantially moisture-free conditions to avoid hydrolysis, e.g. formation of fatty acids, with preferably carbon dioxide, using an extraction vessel in which a temperature preferably ranging from 40° to 250° C. and a pressure preferably ranging from 100 to 400 bar prevail. Ideally, a temperature ranging from 60° to 100° C. and a pressure ranging from 150 to 250 bar are applied. Within these temperature and pressure ranges a fraction of the total fat blend corresponding to the mixture of triglycerides with a carbon number ranging from 24 to 42 dissolves in the carbon dioxide, whereas the triglycerides with a higher carbon number remain as a residue.

The mixture of triglycerides having a carbon number of 24–42 hereinbefore defined is subsequently separated in a separator by bringing the gas to conditions at which the solubility of the triglycerides is lower than under the extraction conditions, e.g. in any of the following ways:

(a) increasing the temperature to a temperature above the one applied in the extractor, e.g. to a temperature higher than 100° C., while keeping the pressure constant;

(b) lowering the pressure to a pressure below the one applied in the extractor, preferably to a pressure below 100 bar, while keeping the temperature constant;

(c) both increasing the temperature to a temperature above the one in the extractor, e.g. to a temperature higher than 100° C., while keeping the pressure constant, and lowering the pressure to a pressure below the one applied in the extractor, preferably to a pressure below 100 bar, while keeping the temperature constant;

(d) applying subcritical conditions by considerably reducing the pressure to a pressure lower than critical, preferably to less than 40 bar, and applying a temperature within a wide range, e.g. 20°–30° C.

Option (d) is the preferred option.

The separation is allowed to take place after 50–150 kg of $CO_2$ per kg of, for example, butterfat have been passed through the extraction vessel. If this amount is applied, the fraction containing the mixture of triglycerides having a carbon number of 24–42 is obtained in a high yield.

Applicants have found that the fraction containing the mixture of triglycerides with a carbon number ranging from 24 to 42 as defined above imparted butter-like properties to margarines and spreads when used as part of the fat blend used in the production of said products.

Applicants have also found that said fraction containing the mixture of triglycerides of the defined carbon number contained a higher level of butter flavour components than the residual fraction and the starting butterfat. The residual fraction, which predominantly comprises 3 long chain fatty acids, can be used in fat blends, particularly those used for (puff) pastry.

The invention will now be illustrated by the following Examples.

EXAMPLE 1

700 g of butter oil containing 0.2% of residual butter serum were extracted with supercritical $CO_2$, applying a procedure and an apparatus as illustrated in the accompanying drawing (FIG. 1), in which:

$B_1$ represents a 4 l extraction vessel
$B_2$ represents a 2 l separator vessel
$P_1$ represents a compressor
$W_1$ represents a first heat exchanger
$W_2$ represents a second heat exchanger.

The extraction conditions were:
Pressure—200 bar
Temperature—80° C.
Extraction time—15 h Amount of CO$_2$ in circuit—5 kg
Flow rate—6 kg/h
The separation conditions were:
Pressure—30 bar
Temperature—30° C.

135 g of the triglyceride mixture according to the invention were extracted from 700 g of butter oil; 560 g were obtained as a residue (triglycerides with a carbon number higher than 42).

The latter was confirmed by GLC triglyceride and fatty acid analysis. According to Table 1 the short chain fatty acids from C$_4$-C$_{12}$ acids are enriched in the extract, whereas the concentrations of all C$_{18}$ fatty acids (stearic, oleic, linoleic acid) are reduced.

Figure 2:
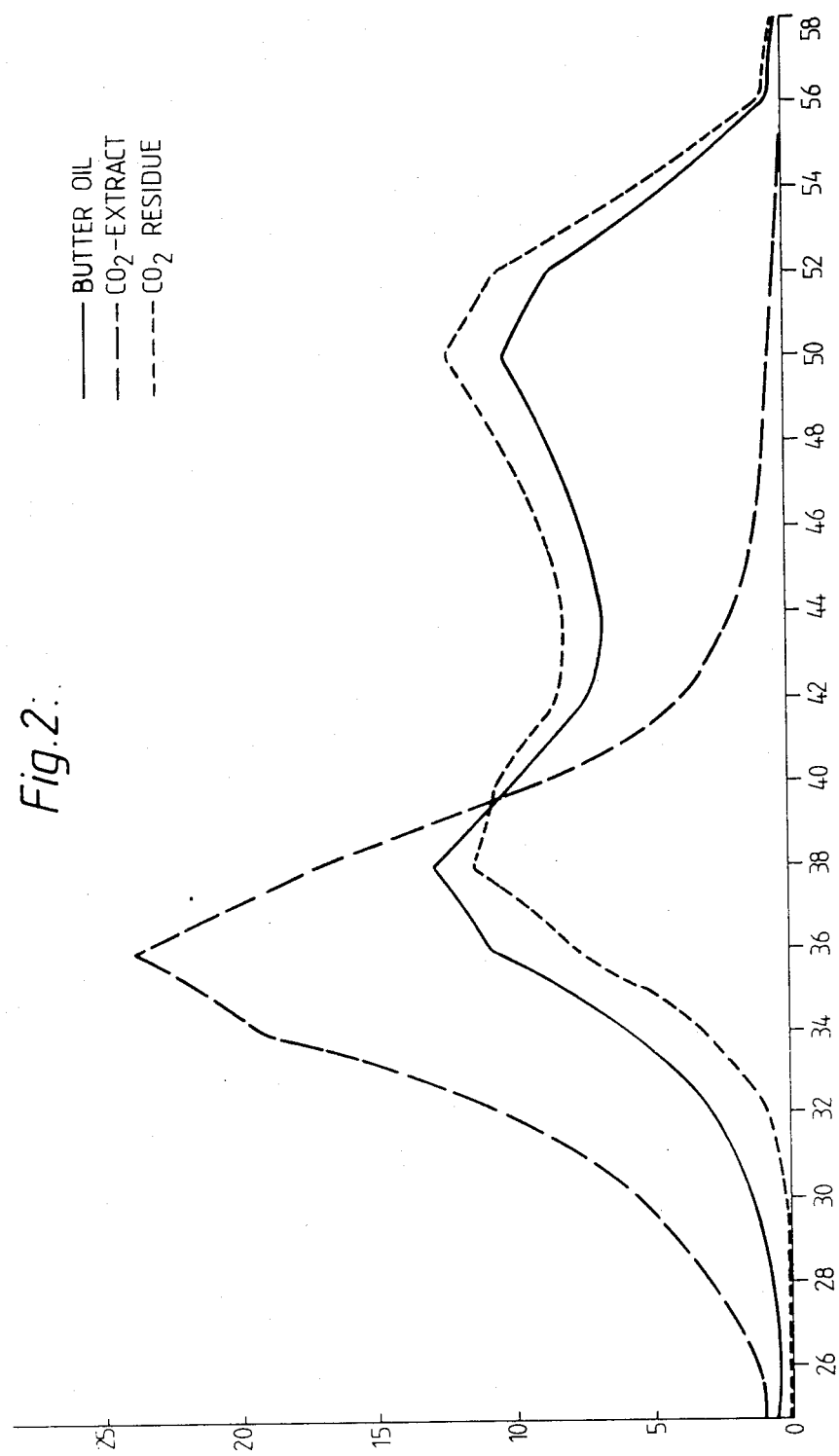

FIG. 2 shows the triglyceride composition according to carbon numbers of the applied butter oil, the extract and the residue. Butter oil has two maxima with carbon numbers 38 and 50. Most of the short chain triglycerides with a carbon number maximum of 36 were extracted.

Table 2 compares iodine values of the applied butter oil, the extract and the residue. The iodine value of the extract is reduced due to the fact that the long chain fatty acids, including oleic and linoleic acid, are enriched in the residue.

The crystallization behaviour of the extract compared with the residue and the butter oil was investigated by determination of the solid contents at different temperatures, by determination of the crystallization rate and by thermo-analysis. Solid contents were low at temperatures above 15° C. and the crystallization rate at 10° C. was very low.

Analysis of the extract by means of thin layer chromatography indicated that the extract was enriched in lactones.

The extract was incorporated in the fatty phase of a standard margarine at a level of 15 wt %. The remaining 85 wt % of the fatty phase consisted of a conventional plastic fat blend. This fatty phase was emulsified in an aqueous phase (16 wt % of the total margarine composition) and the emulsion obtained was cooled and texturized in a Votator. This margarine, when compared to a margarine wherein the fatty phase consisted for 100% of the conventional fat blend, displayed improved butter-like properties.

TABLE 1

Fatty acid composition of butter oil, supercritical carbon dioxide extract, and residue

| Product | Fatty acids (% of GLC area) | | | | | |
|---|---|---|---|---|---|---|
| | C$_{4:0}$ | C$_{6:0}$ | C$_{8:0}$ | C$_{10:0}$ | C$_{12:0}$ | C$_{4:0}$ |
| Butter oil | 2.8 | 2.2 | 1.5 | 3.3 | 4.1 | 11.8 |
| Extract | 6.4 | 4.3 | 3.0 | 5.9 | 6.9 | 16.0 |
| Residue | 2.0 | 1.8 | 1.1 | 2.8 | 13.5 | 10.7 |

| Product | C$_{16:0}$ | C$_{18:0}$ | C$_{18:1}$ | C$_{8:2}$ | C$_{18:3}$ |
|---|---|---|---|---|---|
| Butter oil | 30.0 | 8.9 | 24.4 | 2.7 | 1.3 |
| Extract | 29.2 | 4.9 | 13.5 | 1.7 | 0.6 |
| Residue | 29.9 | 9.8 | 27.0 | 2.9 | 1.5 |

TABLE 2

| | Butter oil | Extract | Residue |
|---|---|---|---|
| Iodine value | 30.3 | 18.6 | 33.6 |
| Solids (%)*: N$_{10}$ | 52.4 | 25.1 | 61.1 |
| N$_{15}$ | 37.1 | 10.7 | 47.5 |
| N$_{20}$ | 18.1 | 0.4 | 26.3 |
| N$_{25}$ | 10.5 | 0.5 | 16.5 |
| N$_{30}$ | 4.4 | 0.8 | 8.0 |
| N$_{35}$ | 0.7 | 0.8 | .7 |

Example 2

The procedure of Example 1 was repeated, except that propane was used.

1500 g of butter oil were extracted in a 4 l vessel with propane under the following conditions:
Pressure—85 bar
Temperature—125° C.
Flow rate—2 kg/h
Total extraction time—6 h.
The conditions in the separator vessel (2 l) were:
Pressure—15 bar
Temperature—90° C.

Two extracts (200 g + 300 g) and a residue (1000 g) were obtained.

Figure 3:
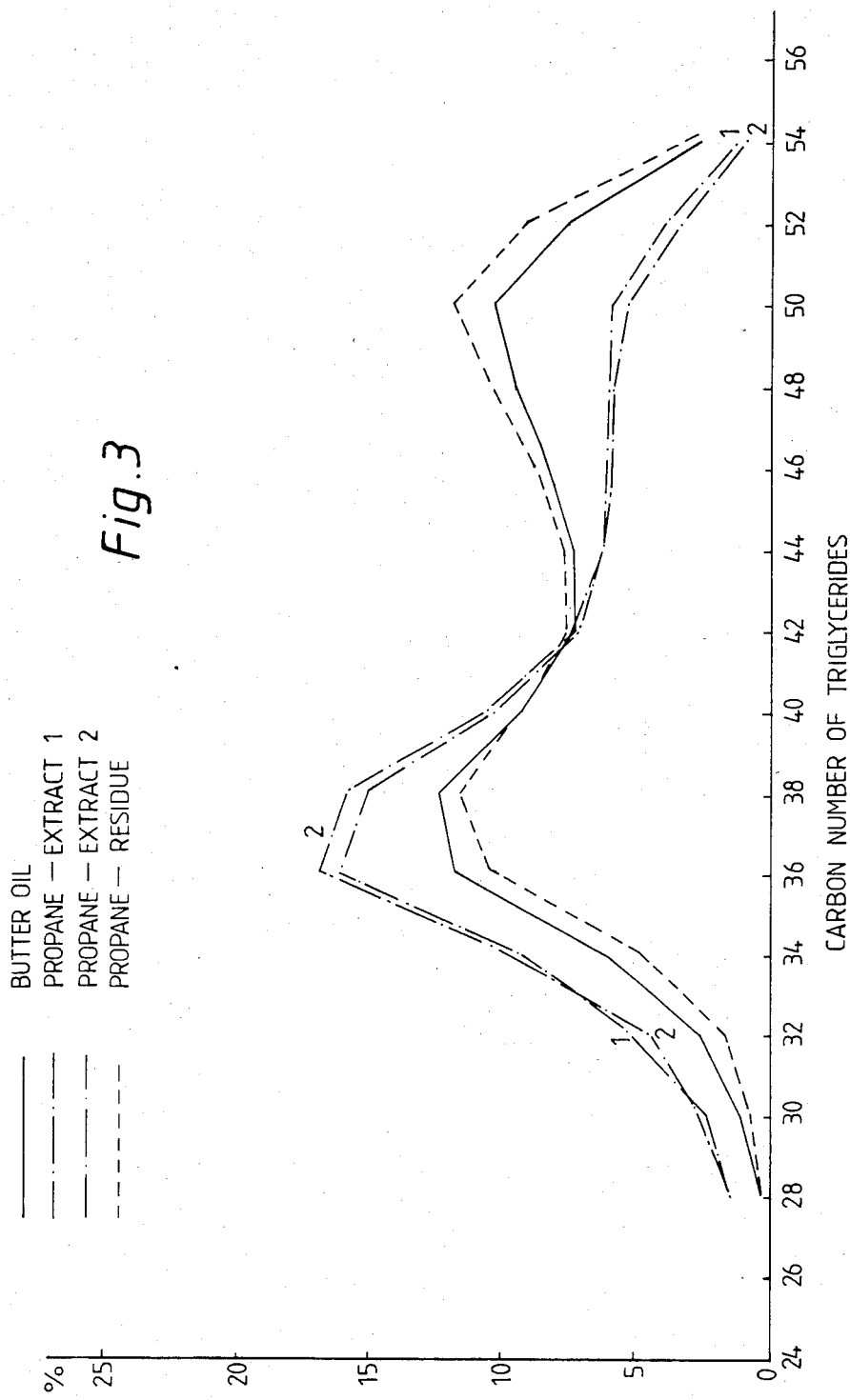

FIG. 3 shows the triglyceride distribution according to carbon numbers of the butteroil, the extract and the residue.

Figure 4:
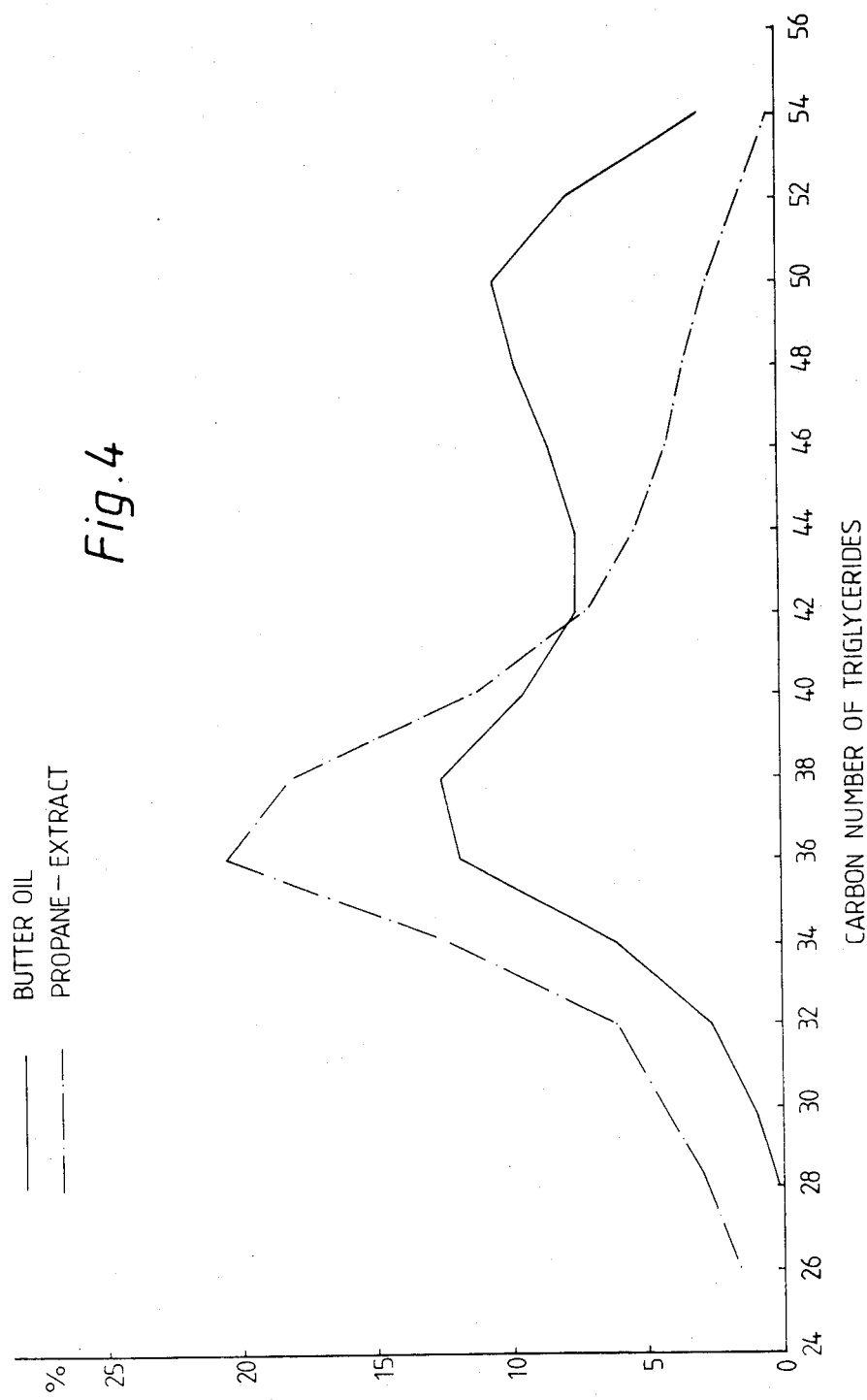

The combined extracts were extracted a second time to achieve a better fractionation (FIG. 4).

EXAMPLE 3

2000 g of a palmkernel stearin were extracted with carbon dioxide under the following conditions:
Pressure—200 bar
Temperature—80° C.
Flow rate—6 kg/h
Extraction time—4.5 h.

Separation of the extract enriched in the mixture of triglycerides according to the invention was carried out under the following conditions:
Pressure—30 bar
Temperature—25° C.

Figure 5:
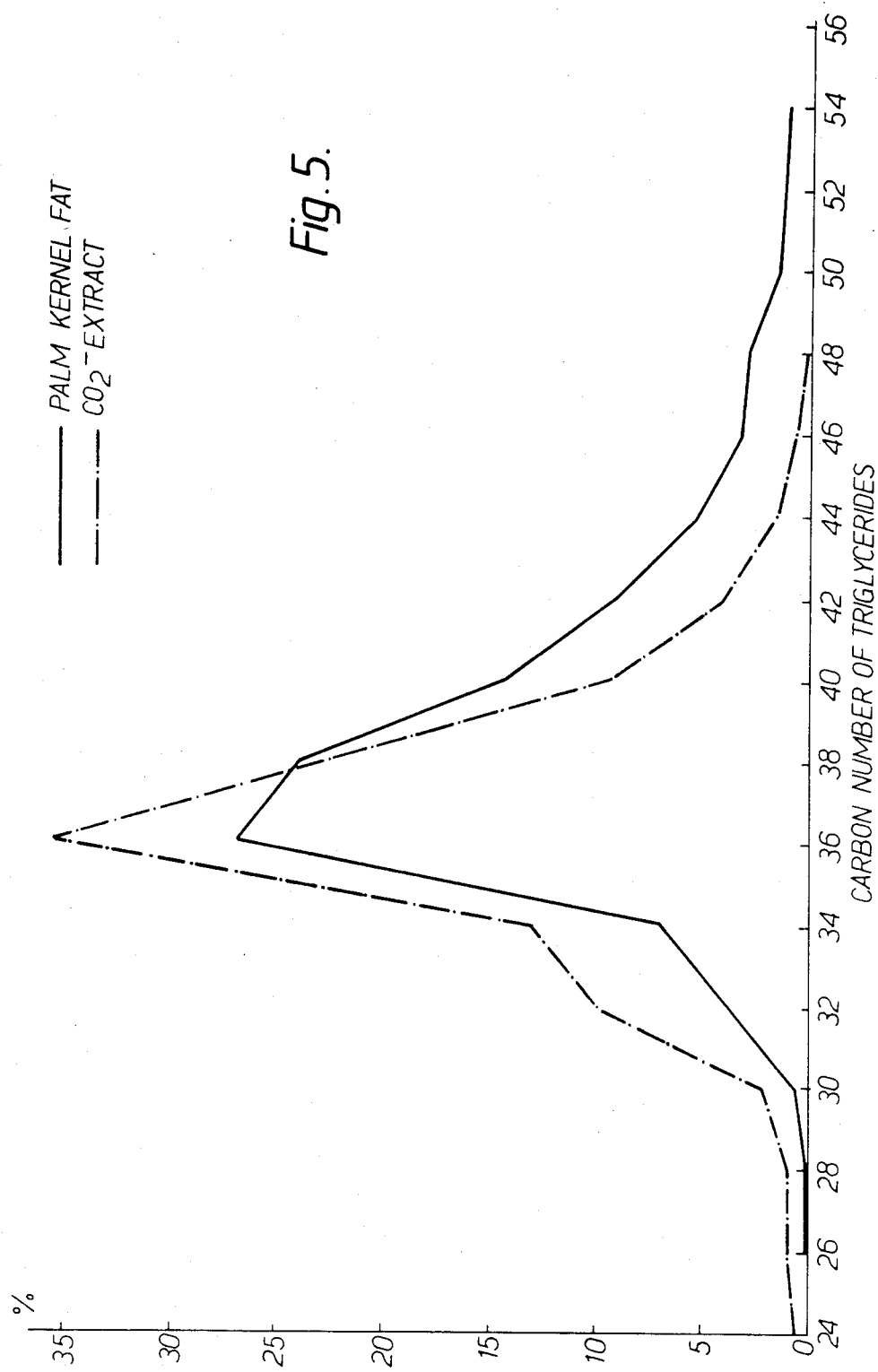

FIG. 5 shows the triglyceride distribution according to the carbon numbers of the palmkernel stearin and the extract.

By optimizing the process higher yields of the extract could be obtained.

We claim:

1. A process for producing a mixture of triglycerides having butter-like properties, comprising
   (a) extracting butterfat with a gas in the supercritical state under pressure and temperature conditions such that a fraction (i) in which from 65 to 100 per cent by weight of the triglycerides having a carbon number ranging from 24 to 42, dissolves in said gas and a fraction (ii) enriched in triglycerides having a carbon number higher than 42 remains as a residue, and
   (b) separating fraction (i) from said gas by applying conditions at which the solubility of the triglycerides in said gas is lower than under the extraction conditions.

2. A process according to claim 1, wherein the extraction is carried out under substantially moisture-free conditions.

3. A process according to claim 1, wherein butterfat is extracted with carbon dioxide at a temperature ranging from 40° to 250° C. and at a pressure ranging from 100 to 400 bar.

4. A process according to claim 3, wherein butterfat is extracted at a temperature ranging from 60° to 100° C. and at a pressure ranging from 150 to 250 bar.

5. A process according to claim 1, wherein fraction (i) is separated from the gas by applying sub-critical 6. A process for producing a mixture of triglycerides having butter-like properties, comprising
  (a) extracting butterfat with a gas in the supercritical state, said gas being selected from the group consisting of $N_2O$, $SF_6$, $CF_3Cl$, $CF_2Cl$, $CH_2CF_2$, $C_3F_8$, $CHF_3$, ethane, propane, butane, ethylene, acetone, carbon dioxide and mixtures thereof, said gas being under pressure and temperature conditions such that a fraction (i) in which from 65 to 100 per cent by weight of the triglycerides having a carbon number ranging from 24 to 42, dissolves in said gas and a fraction (ii) enriched in triglycerides having a carbon number higher than 42 remains as a residue, and
  (b) separating fraction (i) from said gas by applying conditions at which the solubility of the triglycerides in said gas is lower than under the extraction conditions.

* * * * *